Patented Dec. 13, 1949

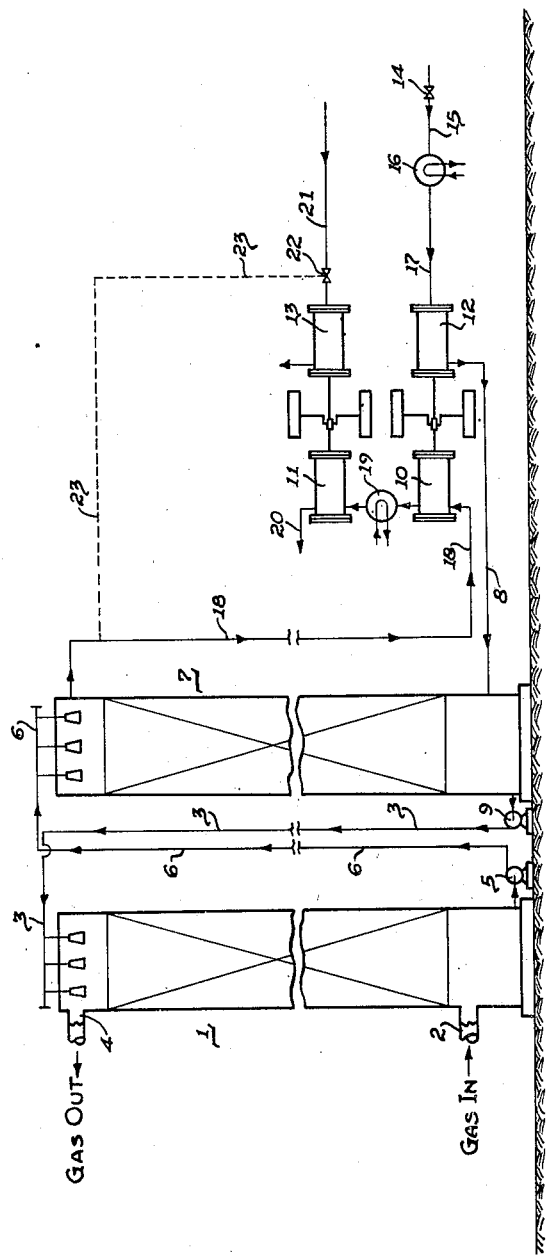

2,490,799

UNITED STATES PATENT OFFICE 2,490,799

GAS PURIFICATION PROCESS

Herbert A. Gollmar, Pittsburgh, Pa., assignor to Koppers Company, Inc., Pittsburgh, Pa., a corporation of Delaware Application February 7, 1946, Serial No. 646,036

5 Claims. (Cl. 23—3)

The present invention relates to an improved cyclic process for continuously removing hydrogen sulphide from gaseous mixtures and is a continuation in part of applicant's copending application Serial No. 543,156, filed July 1, 1944, now abandoned.

In Jacobson U. S. Patent No. 1,390,037 there is set forth a method for purifying gases of hydrogen sulphide by recycling an alkaline absorbent solution in series respectively through absorption and actification steps. This method is principally directed towards the purification of fuel gases, such as coke-oven gas. In the actification step, spent solution from the absorption step is flowed downwardly through an actifier and brought into countercurrent contact with a current of air from an air fan, the said air carrying off absorbed weakly acidic gases present in the solution, principally hydrogen sulphide.

The mixture of air and weakly acidic gases from the actifier can be released to the atmosphere or its heating value can be recovered by utilizing the same as combustion air under steam boilers, gas producers, or coke ovens. In certain localities the actifier air cannot be discharged into the atmosphere because of its noxious odor and must be disposed of in combustion apparatus. The process defined in the Jacobson patent requires only very simple apparatus and is a cheap process to operate, but it may not be used in congested districts where there is insufficient apparatus in and around the gas plant to take care of the actifier air.

Other liquid purification processes in practice as for example the process described and claimed in Powell, U. S. Patent 2,242,323 provide methods for the purification of coke-oven gas with special solutions and the separation and recovery of substantially pure and readily disposable hydrogen sulphide therefrom. These processes require the sweeping action of steam and the application of heat to boil the purification solution containing hydrogen sulphide and sometimes, as in the Powell process, include the operation of the actification zone under a vacuum so as to employ ultimate boiling temperatures providing a maximum partial pressure of hydrogen sulphide in comparative ratio to the partial pressure of water which must be boiled off by the supplied heat or swept through the solution in the form of steam.

It has now been found that the advantages of the process defined in the Jacobson patent can be enjoyed in those congested districts where only limited combustion apparatus exists for burning the actifier-air mixture. It is now possible to operate an installed actifier and purify a larger gas volume of its hydrogen sulphide content while burning the actifier air in existing combustion apparatus.

The primary object of the present invention is to provide a process of gas purification in which the absorption solution can be revivified with a comparatively small amount of air.

Another object of the invention is to provide a process of increasing the treating capacity of existing plants for removing acidic constituents from gases with an alkaline absorption agent.

A further object of invention is to provide a process of removing acidic constituents of fuel gas with an alkaline absorption agent wherein a minimum amount of fixed salt is formed.

The invention has for further objects such other improvements and such other operative advantages or results as may be found to obtain in the processes or apparatus hereinafter described or claimed.

Briefly stated, the present invention comprehends an improved process for the liquid purification of coke-oven gas comprising the improvement of imposing a substantial vacuum on the actifier column in a liquid purification system as is disclosed in the Jacobson patent, such vacuum being at least of the order of about 250 inches of water or 0.6 atmosphere absolute so as to effect an increased capacity of such purification systems by causing an increased volume of air to be swept through the solution in the actification zone and, nevertheless to provide an air and hydrogen sulphide gas mixture of substantially decreased volume when again subjected to atmospheric pressure. The vacuum, which necessarily is imposed on the actification zone to obtain the substantial benefits of the present invention, must be of substantial order and not, as is practiced, for example, in the process disclosed in Sperr U. S. Patent 1,961,255, that minor degree of vacuum possibly effected by the disposition of a fan, creating the sweep of air through the actification zone ahead of the said zone. The air current causes evaporation so that it is doubtful if a vacuum is created and it certainly does not increase in any measurable degree the evaporation capacity of the liquid purification process.

In the accompanying drawing forming a part of this specification and showing for purposes of exemplification an apparatus in which the preferred process may be practiced, the single figure is a diagrammatic representation in the form of a flow sheet.

In the apparatus shown, the purification of the gas takes place in absorber 1, that can be any one of the well known types of gas and liquid contact apparatus and is here represented as a packed tower. The gas to be purified enters absorber 1 through pipe 2 located near the bottom thereof and passes upwardly in countercurrent to a descending flow of an alkaline absorbent solution, for example, a sodium carbonate solution. The sodium carbonate has absorbent properties with respect to hydrogen sulphide and other weakly acidic gases and is used in such volume as to remove all of the acidic constituents without becoming saturated therewith. The absorbent is introduced into the absorber through line 3 and the purified gas passes from the absorber through line 4.

Upon reaching the bottom of absorber 1, the spent solution passes to pump 5, which sends it through line 6 to the top of an air-actifier 7, a packed tower similar to absorber 1 and adapted to withstand sub-atmospheric pressure conditions. The spent solution passes downwardly through actifier 7 in countercurrent to a rising flow of air under reduced pressure defined by a vacuum of at least about 250 inches of water and at ordinary atmospheric temperature introduced at the bottom of said actifier through line 8, the spent solution being thereby aerated for the liberation of substantially all of its hydrogen sulphide content. The solution that is now regenerated by removal of hydrogen sulphide is drawn from the bottom of actifier 7 by pump 9 and forced through line 3 to the top of absorber 1 for reuse.

Aeration of a spent alkali absorbent solution by drawing air at atmospheric temperature upwardly through a descending solution under a substantially reduced pressure is a novel departure from the former practice of forcing air upwardly therethrough under a higher pressure. The important advantage of the present improvement is that a smaller volume of air (calculated at atmospheric pressure) can be used in an actifier for effective solution aeration and thus a smaller volume of gas-air mixture flowing from the actifier need be disposed of under combustion equipment. Or an installed actifier, now operated under partial atmospheric pressure, can aerate or regenerate a larger volume of absorbent solution, representing a larger gas scrubbing capacity, while holding the air-gas mixture to be disposed of under combustion equipment substantially constant in volume.

When the increase in capacity of such an aforesaid actifier is such as to provide actification of approximately a 20% increase in absorbent solution volume, a substantial reduction from atmospheric pressure equivalent to about 250 inches of water has been found to be required. It has been established that it is not economical to supply vacuum producing apparatus to existing gas purification systems unless an increase in capacity of at least about 20% is required. It is true also that in the design of new purification plants it is not economical to provide vacuum equipment unless it permits the use of a plant at least 20% smaller in size. Thus a practical critical limit is established requiring a minimum, substantial vacuum of at least 250 inches of water.

The aeration of the spent solution in actifier 7 is effected at reduced pressures created by a two-stage vacuum pump 10 and 11, piston-driven respectively by an air expansion engine 12 and a steam engine 13. The required volume of air for actification is drawn from the atmosphere through volume regulator 14, line 15, is heated by indirect heater 16 with available exhaust steam, hot gas, or the like. The aeration air can also be heated by heat exchange with coke-oven gas yet to be purified so that not only is there a conservation of the energy expended in producing the vacuum, but there is also provided a beneficial cooling of the coke-oven gas. This reduction in the temperature of to-be-treated coke-oven gas improves the efficiency of the subsequent removal of hydrogen sulphide from the gas and also prevents the carrying out of excessive quantities of water vapor from the absorbent solution in the outgoing gas stream. The heated air is then drawn through line 17, the air expansion engine 12, line 8, actifier 7, and line 18 by the first stage vacuum pump 10. The mixture of air and hydrogen sulphide drawn from actifier 7 through line 18 by the first stage vacuum pump 10 then passes through an intercooler 19 into the second stage vacuum pump 11, which then sends the mixture through line 20 for disposal to combustion apparatus (not shown). The vacuum required in actifier 7 is controlled by vacuum pump 11 through its steam engine 13. Steam from line 21 to operate said engine 13 is controlled by regulator 22 that is actuated by the reduced pressure in the line 18 which is transmitted to the regulator through line 23. A single-stage vacuum pump 11 might well be sufficient to maintain the reduced pressure in actifier 7. However, easier control without throttling and an appreciable power saving is effected where energy in the air is recovered in expansion engine 12 and employed to operate pump 10 as the first stage of a two-stage vacuum system. Any available heat from exhaust steam from the engine 13, hot gas, or the like, can be utilized in heater 16 to preheat the incoming air and thus make available this energy for recovery in expansion engine 12. The temperature of the air delivered to the actifier should be the ordinary atmospheric air temperature, about 20° C. to 30° C. The total power for producing the required reduced pressures in actifier 7 with a single vacuum pump can be reduced substantially by 50% when an expansion engine is utilized as hereinabove described.

When an actifier is operated under subatmospheric pressure the aerating air has a lower density and can be put through the actifier at a higher rate, and thus said actifier can revivify a larger volume of solution. Surprisingly, it has been found that under said reduced pressure conditions the performance of the packing in a packed actifier tower becomes appreciably more efficient. Under the reduced pressure the conversion of alkali-metal carbonate to unwanted alkali-metal thiosulphate is reduced, due to reduction in the partial pressure of oxygen in contact with the solution. This lowering in the alkali-metal thiosulphate concentration makes the separation and recovery of relatively purer alkali-metal thiocyanate from the scrubbing solution a more economical operation.

When, for example, an existing gas purification plant comprising an absorber and air actifier is required to double the volume to-be-purified gas, the hydrogen sulphide content and other conditions remaining essentially the same, the necessary addition and usually about double the absorbing capacity can be provided for. The essentially doubled volume of absorption solution can be handled in the original actifier, reinforced to withstand a vacuum, by operating the actifier at about one-fourth atmospheric pressure without other change in the size of the actifier. However, owing to the unexpectedly increased packing efficiency in the actifier, the actification with air at a third rather than a fourth atmosphere pressure (absolute) in the actifier will suffice to revivify the required volume of solution. The loss in sodium carbonate reagent due to conversion to sodium thiosulphate is almost in proportion to the pressure reduction. Thus, the loss at atmospheric pressure is about three times the loss at a third atmospheric pressure (absolute). However, the important result attained is that the hydrogen sulphide-air mixture volume as utilized under the plant boilers or gas producers will be essentially the same for this double volume of to-be-purified gas as for the original gas volume with operation of the actifier as illustrated in the Jacobson patent. Thus, in an installed gas plant, and without increase in combustion apparatus, it is now possible to expand the gas purification capacity to care for a greater volume of gas or for a gas having a greatly increased hydrogen sulphide content or to provide a purified gas wherein the small residual hydrogen sulphide content must be even further decreased. The reduced pressure conditions can vary widely and should be determined empirically to meet these varying operating requirements.

The invention as hereinabove set forth is embodied in particular form and manner, but may be variously embodied within the scope of the appended claims.

I claim:

1. In a process for removing hydrogen sulphide from fuel gases with alkaline solution, the improvement comprising the step of actifying the spent alkaline solution by aeration at ordinary atmospheric temperatures and under less than atmospheric pressure, defined by a vacuum in excess of 250 inches of water, and thereby removing absorbed hydrogen sulphide.

2. A process for minimizing the production of alkali metal thiosulphate in a spent alkali-metal carbonate absorbent solution for hydrogen sulphide, during an actification step for said solution, comprising: aerating the solution in countercurrent contact with such a reduced volume of air at a subatmospheric pressure, defined by a vacuum in excess of 250 inches of water, that a minimum amount of alkali-metal carbonate will be converted to thiosulphate.

3. In a process for removing hydrogen sulphide from fuel gases by means of alkaline solution, the improvement in the actification step for spent solution, whereby controllably lower volumes of hydrogen sulphide-air mixture are given off therefrom, comprising, flowing said spent solution countercurrently to air at 20° to 30° C. and drawn therethrough at reduced pressures, defined by a vacuum in excess of 250 inches of water and thereby effectively removing hydrogen sulphide from said solution in an admixture with air having a lower volume than with air actification at atmospheric pressure.

4. A process of purifying fuel gas comprising: scrubbing the gas with an alkali metal carbonate solution to absorb hydrogen sulphide therefrom, separating the absorbent solution from the gas, passing solution through an aeration tower, drawing air through the solution in the tower by a vacuum pump driven by a steam engine and an expansion engine to create a subatmospheric pressure defined by a vacuum in excess of 250 inches of water, preheating the air being circulated through the absorption solution with exhaust steam from the vacuum pump and operating the expansion engine with the air preheated by exhaust steam.

5. A process for treating fuel gas comprising the steps of recirculating an alkali metal carbonate solution between a scrubber in which the gas is scrubbed by the absorbent solution to remove sulphide impurities from the gas and an actifier in which the absorbent solution is regenerated by aeration at pressure substantially below atmosphere at least on the order of one-third of an atmosphere, supplying air from the atmosphere through an expansion engine to said actifier, and withdrawing gas from said actifier by means including a vacuum pump operated at least in part by said expansion engine.

HERBERT A. GOLLMAR.

REFERENCES CITED

The following references are of record in the file of this patent:

UNITED STATES PATENTS

| Number | Name | Date |
|---|---|---|
| 1,961,255 | Sperr | June 5, 1934 |